US011878696B2

United States Patent
Kobayashi et al.

(10) Patent No.: US 11,878,696 B2
(45) Date of Patent: Jan. 23, 2024

(54) ANOMALY DETECTION APPARATUS, METHOD, SYSTEM AND PROGRAM

(71) Applicant: NIPPON TELEGRAPH AND TELEPHONE CORPORATION, Tokyo (JP)

(72) Inventors: Kazunori Kobayashi, Tokyo (JP); Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 17/610,144

(22) PCT Filed: May 16, 2019

(86) PCT No.: PCT/JP2019/019545
§ 371 (c)(1),
(2) Date: Nov. 9, 2021

(87) PCT Pub. No.: WO2020/230323
PCT Pub. Date: Nov. 19, 2020

(65) Prior Publication Data
US 2022/0219703 A1 Jul. 14, 2022

(51) Int. Cl.
*B60W 40/06* (2012.01)
*G01H 11/06* (2006.01)
*H04L 27/26* (2006.01)

(52) U.S. Cl.
CPC ............ *B60W 40/06* (2013.01); *G01H 11/06* (2013.01); *H04L 27/2672* (2013.01); *B60W 2552/35* (2020.02)

(58) Field of Classification Search
CPC .. B60W 40/06; B60W 2552/35; G01H 11/06; H04L 27/2672
(Continued)

(56) References Cited

U.S. PATENT DOCUMENTS

2008/0106436 A1\* 5/2008 Breed .................. G05D 1/0246
340/905
2008/0133136 A1\* 6/2008 Breed ..................... G01S 19/17
340/901
(Continued)

FOREIGN PATENT DOCUMENTS

CN 110155066 A \* 8/2019 ............ B60W 40/06
CN 110243465 A \* 9/2019 ............. G01H 17/00
(Continued)

OTHER PUBLICATIONS

"Road Emergency Dial (#9910)" [online], [retrieved on Apr. 23, 2019] Ministry of Land, Infrastructure, Transport and Tourism, Internet <URL:http://www.mli t.go.jp/road/dia/> with its translation by computer.

*Primary Examiner* — Atul Trivedi (57) ABSTRACT

An abnormality detection device 1 includes: a vibration acquisition unit 11 configured to acquire an acoustic signal generated during passage of a vehicle on a road; a frequency domain conversion unit 12 configured to convert the acquired acoustic signal into a frequency domain signal; an unexpectedness determination unit 13 configured to determine whether there is unexpectedness at each predetermined frequency using the frequency domain signal; and an abnormality determination unit 14 configured to determine whether there is an abnormality in the road based on the number of frequencies at which it is determined that there is the unexpectedness.

7 Claims, 8 Drawing Sheets

(58) Field of Classification Search
USPC .......................................................... 701/1
See application file for complete search history.

(56) References Cited

U.S. PATENT DOCUMENTS

| | | | | |
|---|---|---|---|---|
| 2008/0137062 | A1* | 6/2008 | Holton | G01S 17/58 |
| | | | | 356/28 |
| 2008/0140318 | A1* | 6/2008 | Breed | G01C 21/28 |
| | | | | 702/3 |
| 2013/0222127 | A1* | 8/2013 | Ray Avalani | B60Q 1/00 |
| | | | | 340/436 |
| 2016/0109355 | A1* | 4/2016 | Takaeda | G01N 29/46 |
| | | | | 702/34 |
| 2016/0264148 | A1* | 9/2016 | Liu | B60W 40/06 |
| 2018/0003593 | A1* | 1/2018 | Siegel | B60C 11/246 |
| 2018/0314258 | A1* | 11/2018 | Brew | B60W 30/10 |
| 2019/0120967 | A1* | 4/2019 | Smits | G01C 21/3626 |
| 2019/0258251 | A1* | 8/2019 | Ditty | B60W 50/023 |
| 2019/0354629 | A1* | 11/2019 | Zavesky | G06F 16/24575 |
| 2020/0152053 | A1* | 5/2020 | Rogers | G08G 1/0125 |
| 2020/0202643 | A1* | 6/2020 | He | G01R 31/367 |
| 2021/0088784 | A1* | 3/2021 | Whitmire | G02B 27/0101 |
| 2023/0269024 | A1* | 8/2023 | Lee | H04L 1/06 |
| | | | | 714/750 |

FOREIGN PATENT DOCUMENTS

| | | | | | |
|---|---|---|---|---|---|
| CN | 112373285 | A | * | 2/2021 | ........... B60K 5/1208 |
| EP | 3560783 | A1 | * | 10/2019 | ........... B60W 40/06 |
| GB | 2554014 | A | * | 3/2018 | ............... B60L 15/42 |
| WO | WO-2018104929 | A1 | * | 6/2018 | ........... G05B 19/042 |
| WO | WO-2018190216 | A1 | * | 10/2018 | ............. F03D 17/00 |
| WO | WO-2019045043 | A1 | * | 3/2019 | ............. B65G 17/38 |
| WO | WO-2021118822 | A1 | * | 6/2021 | ........... G05D 1/0027 |

* cited by examiner

ANOMALY DETECTION APPARATUS, METHOD, SYSTEM AND PROGRAM

CROSS-REFERENCE TO RELATED APPLICATIONS

This application is a U.S. National Stage Application filed under 35 U.S.C. § 371 claiming priority to International Patent Application No. PCT/JP2019/019545, filed on 16 May 2019, the disclosure of which is hereby incorporated herein by reference in its entirety.

TECHNICAL FIELD

The present invention relates to a technology for detecting an abnormality in a road.

BACKGROUND ART

Abnormalities in roads are ascertained when drivers of vehicles visually observe the abnormalities and contacts road managers or the like. Road managers inspect and find abnormalities periodically in some cases.

CITATION LIST

Non Patent Literature

[NPL 1] "Road Emergency Dial (#9910)" [online], [retrieved on 23 Apr. 2019] Ministry of Land, Infrastructure, Transport and Tourism, Internet <URL:http://www.mlit.go.jp/road/dia/>

SUMMARY OF THE INVENTION

Technical Problem

However, even if a driver of a vehicle finds an abnormality in a road, the driver may not be able to contact road managers and the abnormalities in the road may be left as it is. Because inspection by road managers is carried out at long intervals such as once every few years, it takes time to find abnormalities and dangerous states are left as they are in some cases.

The present invention provides an abnormality detection device, method, system, and program capable of detecting an abnormality in a road more quickly than in the related art.

Means for Solving the Problem

According to an aspect of the present invention, an abnormality detection device includes: a vibration acquisition unit configured to acquire an acoustic signal generated during passage of a vehicle on a road; a frequency domain conversion unit configured to convert the acquired acoustic signal into a frequency domain signal; an unexpectedness determination unit configured to determine whether there is unexpectedness at each predetermined frequency using the frequency domain signal; and an abnormality determination unit configured to determine whether there is an abnormality in the road based on the number of frequencies at which it is determined that there is unexpectedness.

The vibration acquisition unit may acquire a vibration signal which is a signal of vibration generated during passage of a vehicle on a road and convert the acquired vibration signal into the frequency domain signal.

According to another aspect of the present invention, an abnormality detection system includes: the abnormality detection device. The abnormality detection system further comprises an abnormality detection device including a positional information transmission unit that transmits positional information of the road on which it is determined that there is the abnormality, (i) a positional information reception unit that receives the transmitted positional information, (ii) a histogram generation unit that generates a histogram by counting the number of positions corresponding to the received positional information at each pre-decided region, and (iii) an abnormality location detection unit that determines a location at which there is an abnormality based on the generated histogram.

Effects of the Invention

It is possible to detect abnormalities in roads more quickly than in the related art.

DESCRIPTION OF EMBODIMENTS

Hereinafter embodiments of the present invention will be described in detail. In the drawings, the same reference numerals are given to constituent elements that have the same functions and description thereof will be omitted.

First Embodiment

Figure 1:
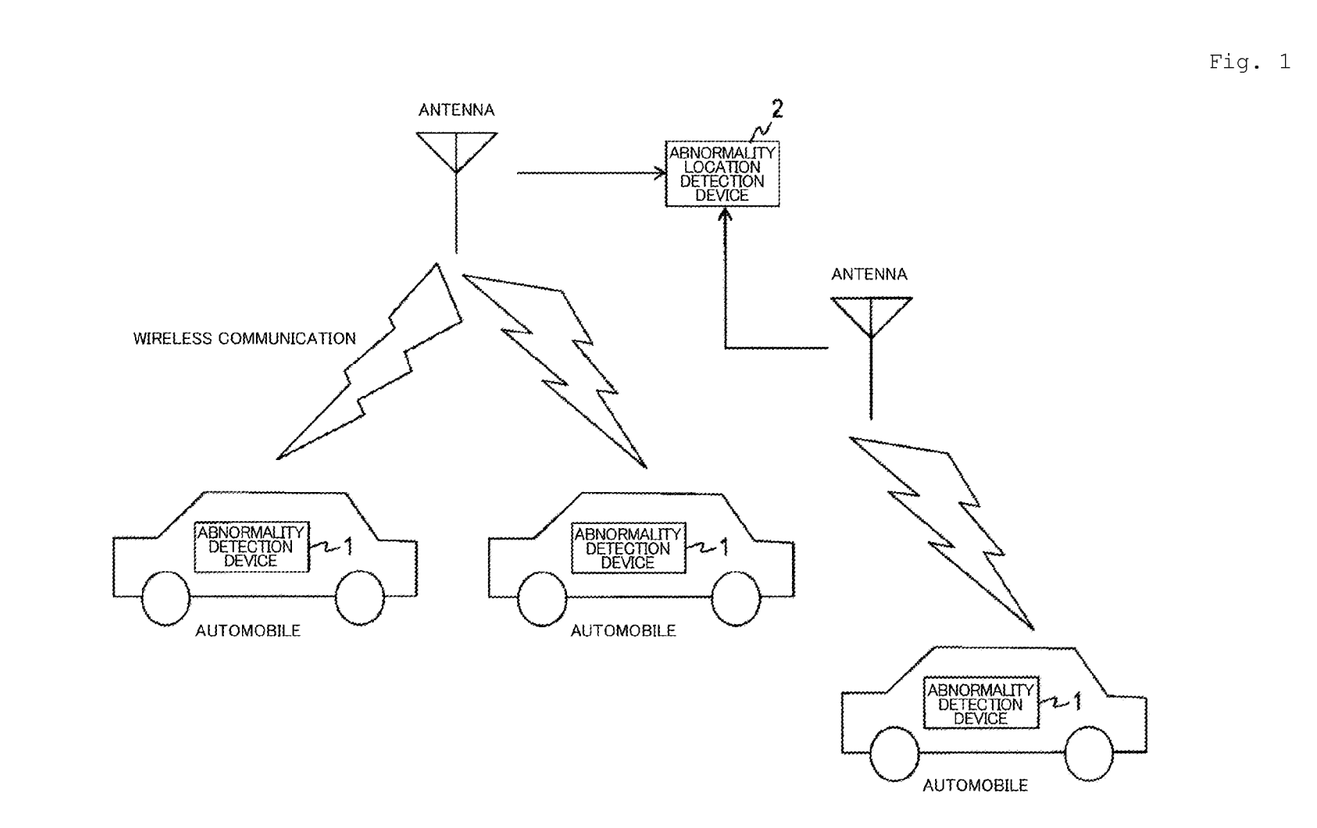
FIG. 1 is a diagram illustrating an overview of an abnormality detection system.

FIG. 1 is a diagram illustrating an overview of an abnormality detection system.

At present, the number of vehicles connected to portable communication networks is increasing due to communication devices such as smartphones carried by drivers or communication units with vehicles such as automobiles are equipped as standard. Communication devices or vehicles are equipped with sensors such as GPS sensors, acceleration sensors, microphones, and video cameras are equipped in some cases. An abnormality detection device, method, and system detect abnormalities in roads using these sensors.

Figure 2:
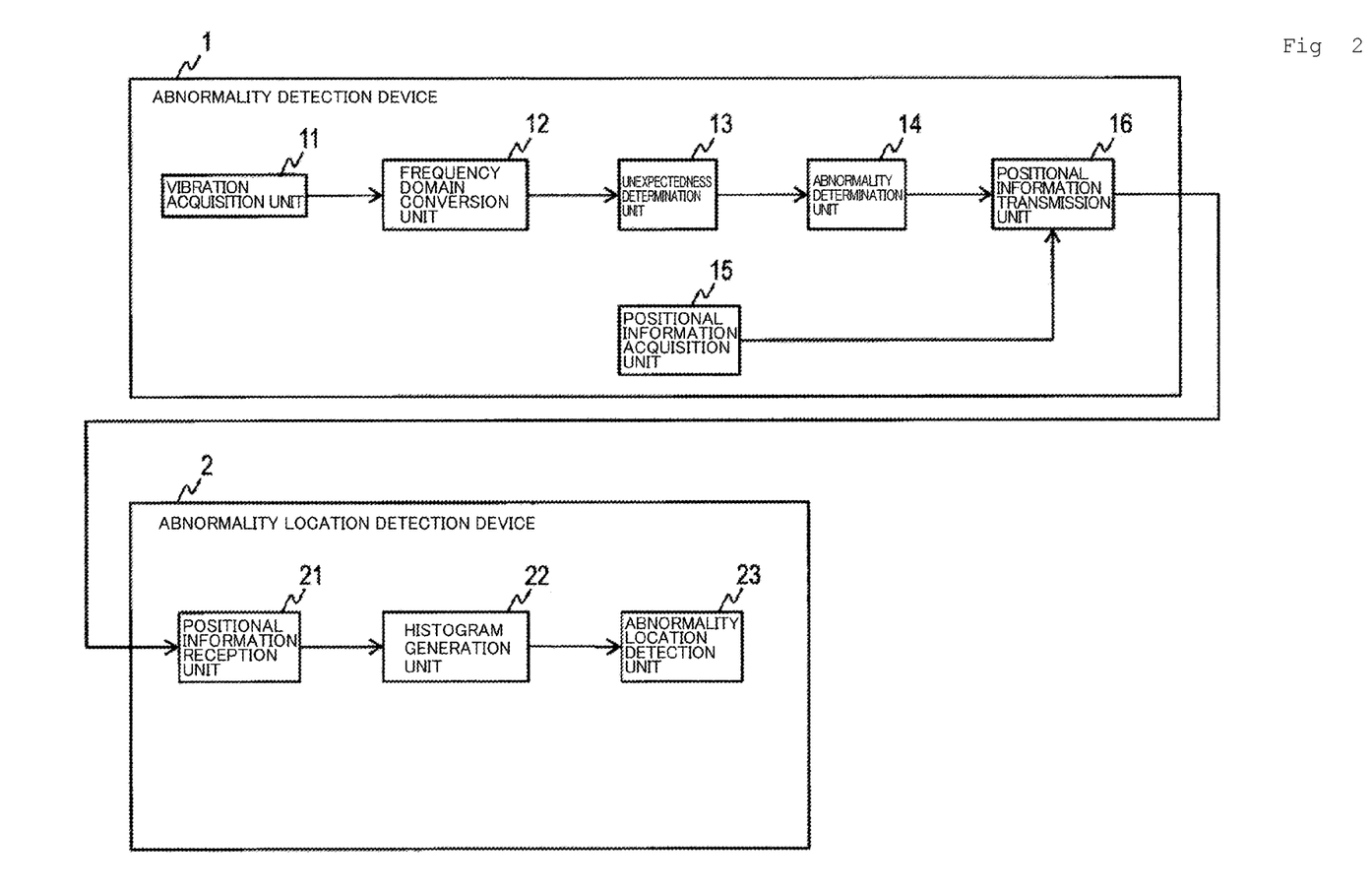
FIG. 2 is a diagram illustrating an example of a functional configuration of an abnormality detection system according to a first embodiment.

FIG. 2 is a diagram illustrating an example of a functional configuration of an abnormality detection system according to a first embodiment.

The abnormality detection system includes, for example, an abnormality detection device 1 and an abnormality location detection device 2.

Figure 3:
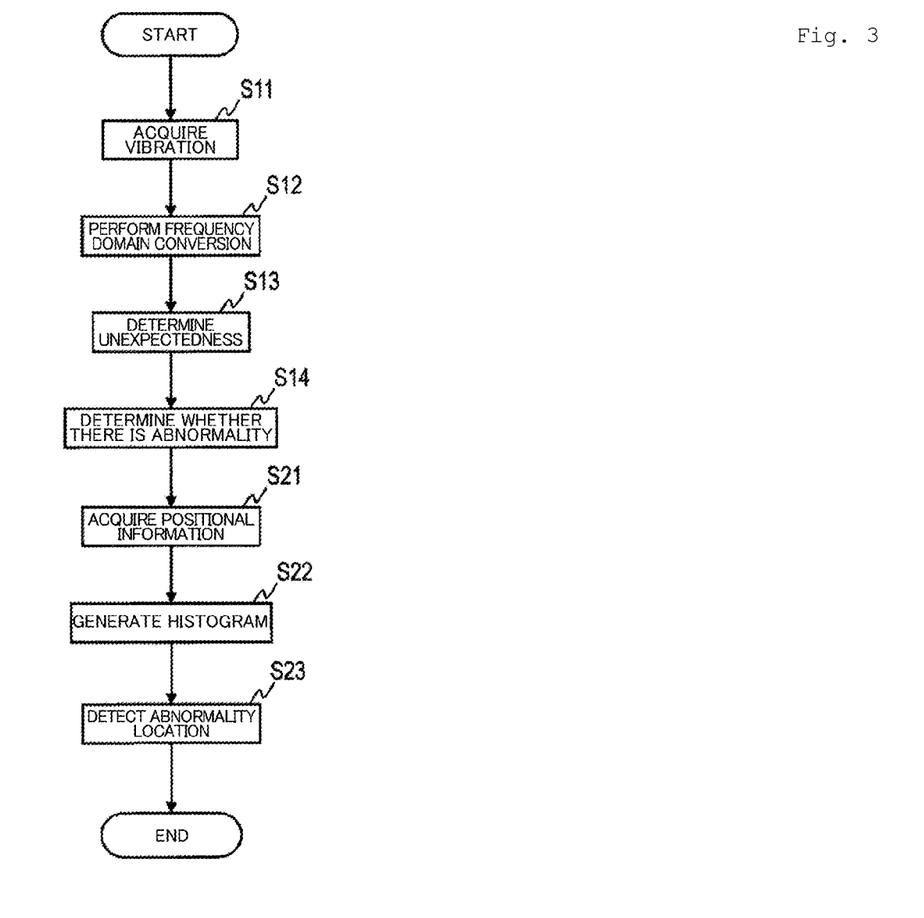
FIG. 3 is a diagram illustrating an example of a processing procedure of an abnormality detection method.

An abnormality detection method is realized, for example, by causing each constituent elements of the abnormality detection device to perform a process of steps S11 to S14 illustrated in FIG. 3 to be described below. The abnormality detection method may be realized, for example, by causing each constituent elements of the abnormality detection system to perform a process of steps S11 to S23 illustrated in FIG. 3 to be described below.

[[Abnormality Detection Device 1]]

The abnormality detection device 1 includes, for example, a vibration acquisition unit 11, a frequency domain conversion unit 12, an unexpectedness determination unit 13, an abnormality determination unit 14, a positional information acquisition unit 15, and a positional information transmission unit 16.

<Vibration Acquisition Unit 11>

The vibration acquisition unit 11 acquires a vibration signal which is a signal of vibration generated during passage of a vehicle on a road (step S1). The vibration acquisition unit 11 is a sensor such as a microphone, a vibration sensor, or an acceleration sensor that acquires a vibration signal. The vibration signal is assumed to include an acoustic signal which is a signal of longitudinal wave vibration of an elastic medium such as air and is acquired by a microphone.

The vibration signal acquired by the vibration acquisition unit 11 is output to the frequency domain conversion unit 12.

<Frequency Domain Conversion Unit 12>

The frequency domain conversion unit 12 converts the acquired vibration signal into a frequency domain signal (step S12). The converted frequency domain signal is output to the unexpectedness determination unit 13.

<Unexpectedness Determination Unit 13>

The unexpectedness determination unit 13 determines whether there is unexpectedness for each predetermined frequency using the frequency domain signal (step S13). A determination result by the unexpectedness determination unit 13 is output to the abnormality determination unit 14.

The unexpectedness determination unit 13 determines unexpectedness in conformity with, for example, the following scheme.

The unexpectedness determination unit 13 calculates a short-time average level (a level in a time window of about several ms to tens of ms) and a long-time average level (a level in a time window of about hundreds of ms to several s) of a level (spectrum) of each frequency. The unexpectedness determination unit 13 calculates a ratio of the levels at each frequency and sets this ratio as an index of unexpectedness. When the index exceeds a threshold set in advance, the unexpectedness determination unit 13 determines that there is unexpectedness in the vibration signal at the frequency.

Figure 4:
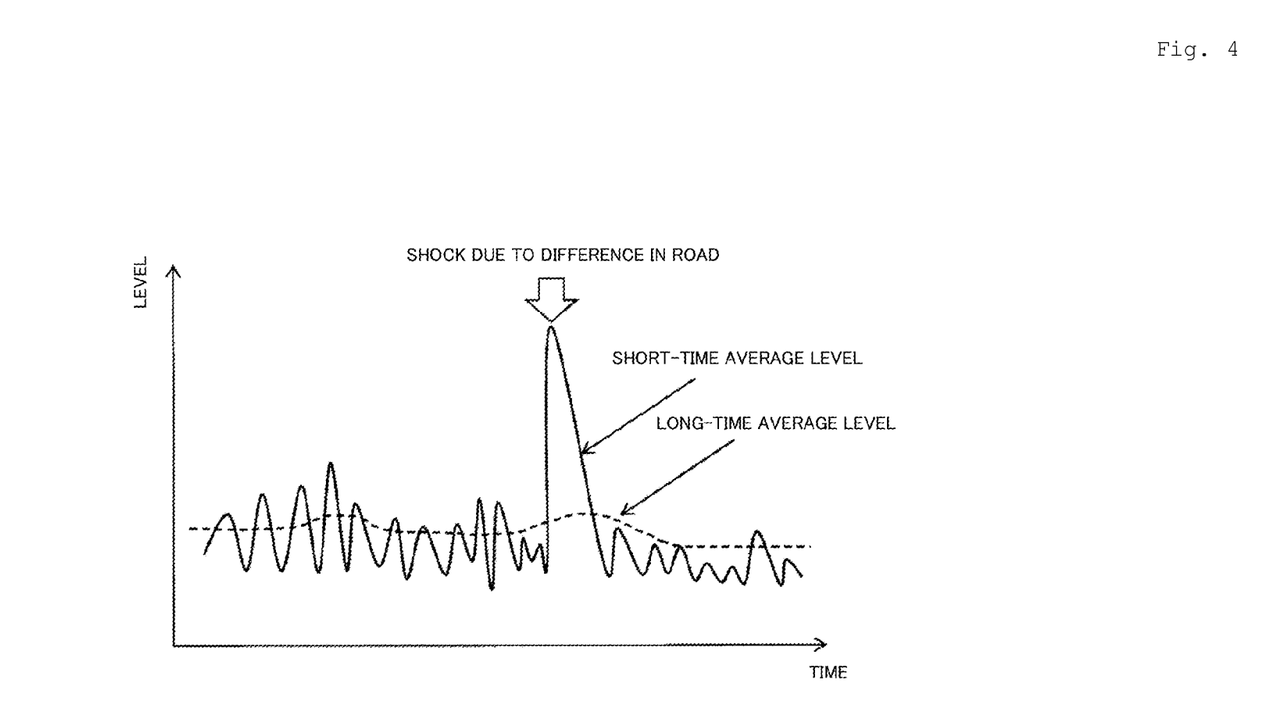
FIG. 4 is a diagram illustrating an example of determination for unexpectedness.

When a shock is received due to a level difference on road, as illustrated in FIG. 4, the short-time average level temporarily becomes greater than the long-time average level. In conformity with this scheme, unexpectedness of the vibration signal based on the shock occurring due to the level difference on a road can be detected.

The unexpectedness determination unit may be an identification unit such as a neural network learned so that unexpected and expected signals are classified. For example, the neural network is a neural network in which the short-time average level or the long-time average level of the level (spectrum) of each frequency is an input. Learning is performed in advance in conformity with a scheme such as backpropagation so that an output is 1.0 when an unexpected signal is input, and an output is 0.0 when an expected signal is input. The detection is performed so that it is assumed that there is unexpectedness when an output of the neural network exceeds a threshold set between 0.0 and 1.0 set in advance.

In this way, by detecting unexpectedness at each frequency, it is possible to reduce an influence of traveling noise concentrated on a low frequency and it is possible to increase determination accuracy regarding whether there is an abnormality in a road.

<Abnormality Determination Unit 14>

The abnormality determination unit 14 determines whether there is an abnormality in a road based on the number of frequencies at which it is determined that there is unexpectedness (step S14). A determination result of the abnormality determination unit 14 is output to the positional information transmission unit 16.

For example, the abnormality determination unit 14 determines that there is abnormality on a road when the number of frequencies at which it is determined at the same time that there is the unexpectedness is greater than a threshold set in advance.

<Positional Information Acquisition Unit 15>

The positional information acquisition unit 15 acquires positional information of a vehicle and outputs the positional information to the positional information transmission unit 16. The positional information is, for example, GPS positional information.

<Positional Information Transmission Unit 16>

The determination result by the abnormality determination unit 14 and positional information of a vehicle are input to the positional information transmission unit 16.

The positional information transmission unit 16 transmits the positional information of a road on which it is determined that there is an abnormality (step S16).

More specifically, the positional information transmission unit 16 determines the positional information on the road on which it is determined that there is an abnormality based on the input determination result and the positional information, and outputs the positional information of the road on which it is determined that there is the unexpectedness to the abnormality location detection device 2.

[[Abnormality Location Detection Device 2]]

The abnormality location detection device 2 includes, for example, a positional information reception unit 21, a histogram generation unit 22, and an abnormality location detection unit 23.

<Positional Information Reception Unit 21>

The positional information reception unit 21 receives the positional information transmitted by the positional information transmission unit 16 (step S21). The positional information is output to the histogram generation unit 22.

<Histogram Generation Unit 22>

The histogram generation unit 22 generates a histogram by counting the number of positions corresponding to the positional information received by the positional information reception unit 21 for each location decided in advance (step S22). The generated histogram is output to the abnormality location detection unit 23.

Figure 5:
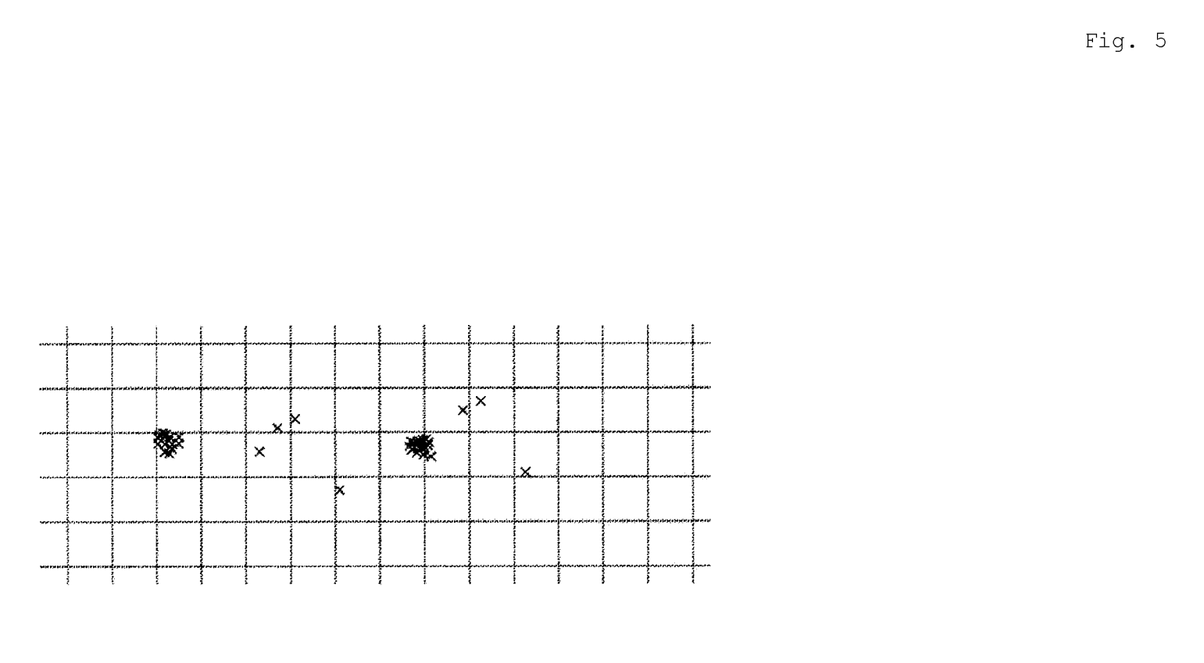
FIG. 5 is a diagram illustrating an example of generation of a histogram.

For example, the histogram is aggregated during a period such as several hours, several days, one month, one year, or the like. For example, as illustrated in FIG. 5, where the number of abnormalities is detected at locations on a map divided by a grid is counted and a number of detections may be obtained for each grid cell. FIG. 5 is a diagram illustrating an example of generation of a histogram.

<Abnormality Location Detection Unit 23>

The abnormality location detection unit 23 determines a location at which there is an abnormality based on the generated histogram (step S23).

For example, the abnormality location detection unit 23 determines that there is an abnormality when a count value of each location exceeds a threshold set in advance.

In conformity with the above-described scheme, for example, an abnormality in a road can be determined from data of a traveling sound or vibration gathered from general vehicles. Thus, it is possible to monitor abnormalities in many roads and detect an abnormality more quickly than in the related art.

Second Embodiment

Figure 6:
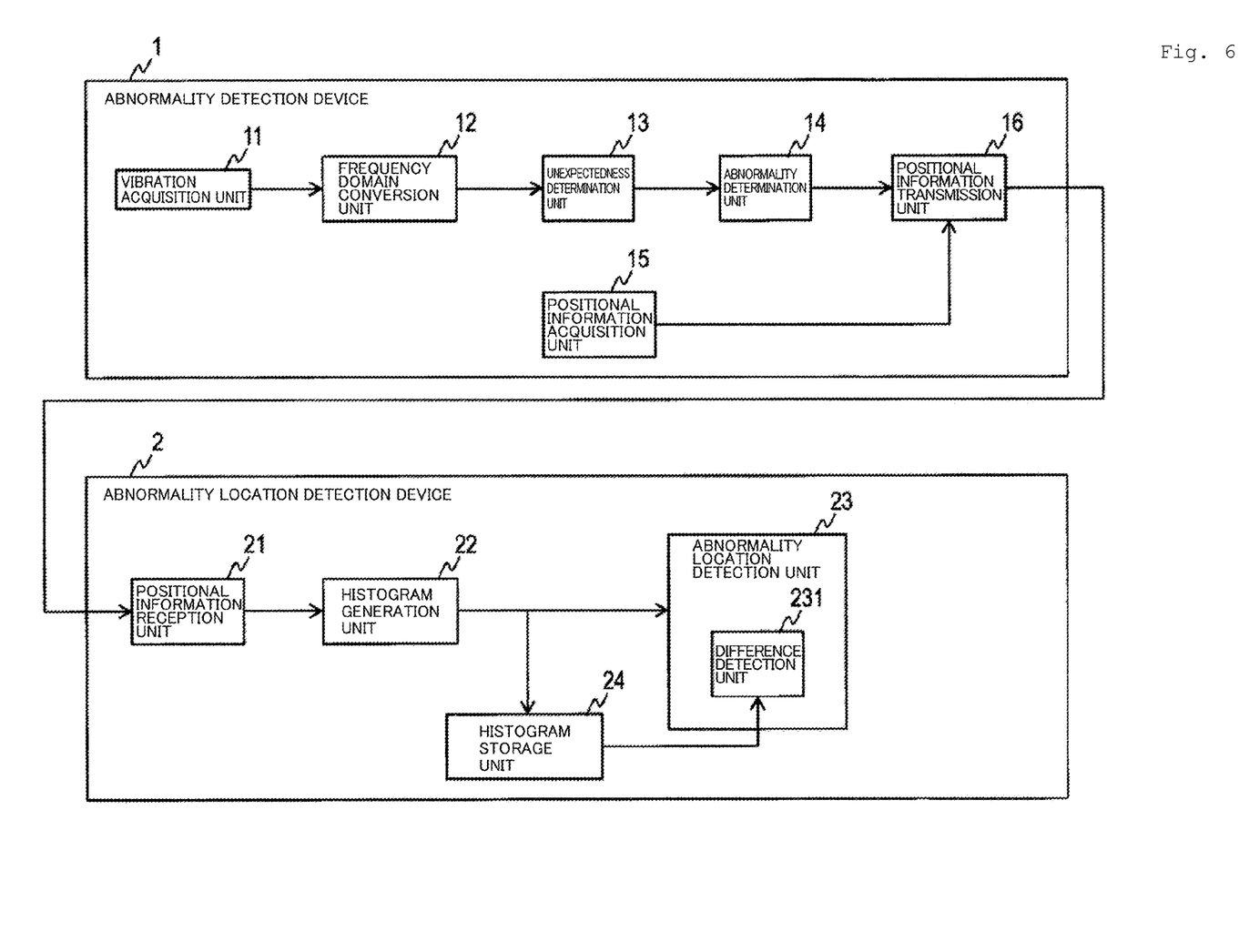
FIG. 6 is a diagram illustrating an example of a functional configuration of an abnormality detection system according to a second embodiment.

In a second embodiment, a histogram storage unit 24 and a difference detection unit 231 are added to the first embodiment.

Hereinafter differences from the first embodiment will be mainly described. Repeated description of portions similar to those of the first embodiment will be omitted.

<Histogram Storage Unit 24>

The histogram generated by the histogram generation unit 22 is stored in the histogram storage unit 24.

Thus, the histogram storage unit 24 stores histograms previously generated by the histogram generation unit 22. An aggregation period of the previous histograms may be longer than an aggregation period of the histogram being presently generated by the histogram generation unit 22.

<Difference Detection Unit 231>

The abnormality location detection unit 23 according to the second embodiment further includes the difference detection unit 231.

The difference detection unit 231 determines a location at which there is an abnormality on the basis of the previously generated histograms read from the histogram storage unit 24. When a location at which it is presently determined that there is the abnormality based on the histogram generated by the histogram generation unit 22, the difference detection unit 231 determines that there is no abnormality.

In this way, the difference detection unit 231 detects a difference between a location at which it is determined based on the previous histograms that there is the abnormality and a location at which it is determined based on the present histogram that there is an abnormality. When abnormality is detected with a present histogram at a present location which is the same as a location at which an abnormality has been detected with the previous histograms, the difference detection unit 231 cancels the detection.

In this way, by excluding detection of a location, such as an abnormality location which has already been recognized or a joint or the like of a bridge, at which unexpectedness may be detected even when there is no abnormality, it is possible to detect a newly occurring abnormality location.

Third Embodiment

Figure 7:
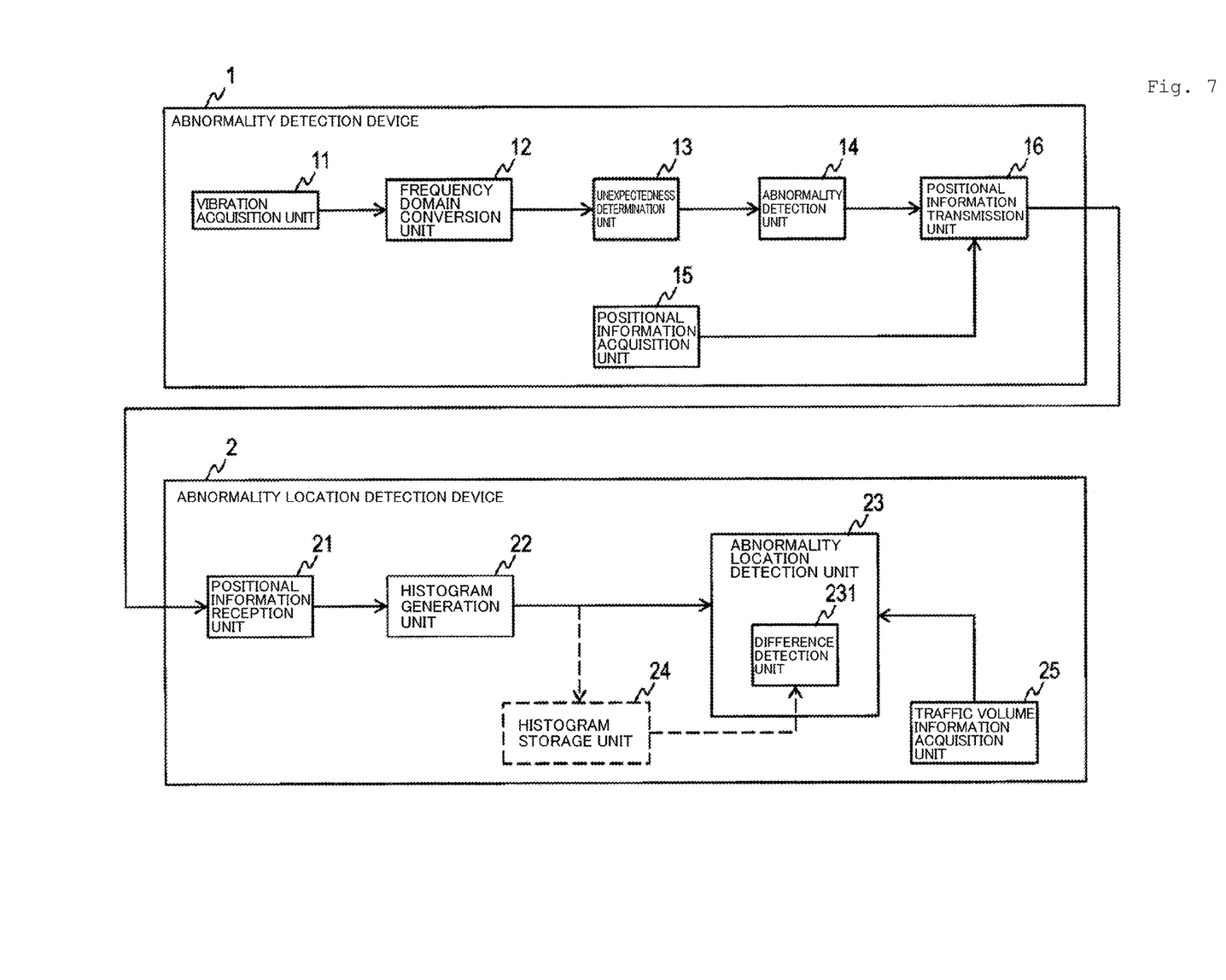
FIG. 7 is a diagram illustrating an example of a functional configuration of an abnormality detection system according to a third embodiment.

In a third embodiment, a traffic volume information acquisition unit 25 is added to the first or second embodiment.

Hereinafter, differences from the first or second embodiment will be mainly described. Repeated description of portions similar to those of the first or second embodiment will be omitted.

The traffic volume information acquisition unit 25 obtains a traffic volume of each location (how many vehicles have passed) from GPS information and previous statistical information of vehicles. That is, the traffic volume information acquisition unit 25 acquires traffic volume information of each location.

The abnormality location detection unit 23 calculates an abnormality detection ratio by dividing a count number included in the histogram generated by the traffic volume corresponding to the traffic volume information of a location corresponding to the count number and determines that there is an abnormality in a region in which a calculated abnormality detection ratio is greater than a predetermined threshold (step S23).

In other words, the abnormality location detection unit 23 calculates a ratio of vehicles for which an abnormality is detected by dividing a value of the histogram for the abnormality detection by a traffic volume and detects a location at which an abnormality arises when this ratio exceeds a threshold set in advance.

In this way, by normalizing the value of the histogram with the traffic volume, it is possible to detect an abnormality location more accurately.

Modification Examples

The embodiments of the present invention have been described. Specific configurations are not limited to the embodiments and it is needless to say that appropriate changes or the like to designs within the scope of the present invention without departing from the gist of the present invention are included in the present invention.

For example, the abnormality detection device may not include the positional information acquisition unit 15 and the positional information transmission unit 16.

The abnormality detection device 1 may not include the frequency domain conversion unit 12. In this case, the vibration signal acquired by the vibration acquisition unit 11 is input to the unexpectedness determination unit 13. In this case, the unexpectedness determination unit 13 calculates a short-time average level (a level in a time window of about several ms to tens of ms) and a long-time average level (a level in a time window of about hundreds of ms to several s) of the input vibration signal. A ratio between the levels is calculated and this ratio is used as an index for unexpectedness. The unexpectedness determination unit 13 determines that there is unexpectedness when the index exceeds a threshold set in advance.

Figure 8:
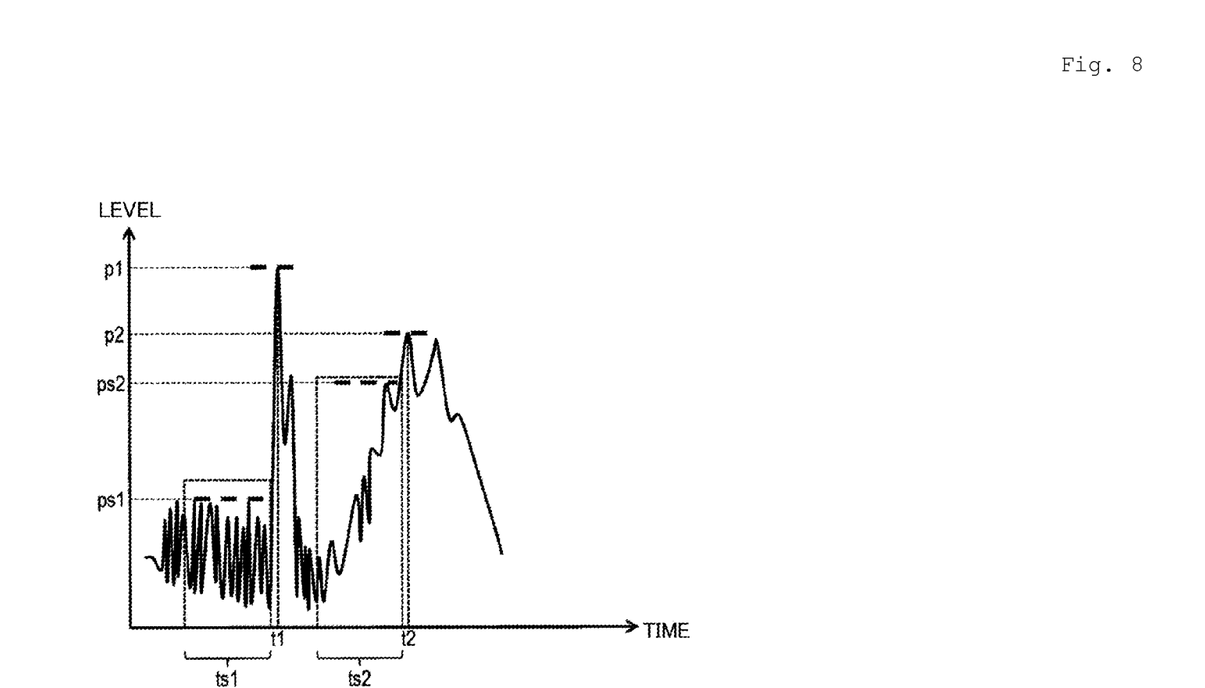
FIG. 8 is a diagram illustrating another example of determination for unexpectedness.

As illustrated in FIG. 8, the unexpectedness determination unit 13 may calculate a ratio $\Lambda(\omega, \tau)$ between a maximum value (for example, ps1, ps2) of a level of a certain fixed section (for example, ts1, ts2) immediately before a target time and a level (for example, p1, p2) of the target time and may determine that a signal of unexpectedness arrives when $\Lambda(\omega, \tau)$ exceeds a certain threshold Th r($\omega$). $\Lambda(\omega, \tau)$ can be expressed as follows. Here, $\omega$ is a frequency and $\tau$ is a discrete time. Here, the foregoing vibration signal is represented as a signal converted into a frequency domain, but may be represented as a signal which is not converted into a frequency domain.

$$\Lambda(\omega, \tau) = \frac{P(\omega, \tau)}{\max_{\tau \in \Delta} \{P(\omega, \tau)\}} \quad \text{[Math. 1]}$$

Here, Δ indicates a discrete time of the certain fixed section (for example, ts1, ts2) immediately before the target time. A section of about 3 to 5 seconds may be set according to a situation of a sound field. $P(\omega, \tau)$ is a level of a frequency ω at a τ time. In comparison between $\Lambda(\omega, \tau)$ and $Thr(\omega)$, robustness with respect to noise can be better achieved when a value averaged in a frequency band with a certain width is used. The frequency width may be selected so that a bandwidth with a high SN ratio during sound reception is selected.

An identification unit may be configured to determine whether there is an abnormality by preparing traveling sounds at normal times, traveling sounds during travel on abnormal road surfaces such as those with holes or level differences in road, and vibration data in advance and learning a neural network for identifying the traveling sound or the vibration data during travel on abnormal road by machine learning. In this case, the unexpectedness determination unit 13 may use the identification unit to determine whether there is an abnormality.

The various processes described in the embodiments may be performed chronologically in the described order and may also be performed in parallel or individually depending on processing performance of a device performing the processes or as necessary.

Data may be directly exchanged between the constituent elements of the abnormality detection device or may be exchanged via a storage unit (not illustrated).

[Program and Recording Medium]

When various processing functions in the above-described devices are realized by a computer, processing content of the functions of the devices are described by a program. The various processing functions in the devices can be realized on the computer by causing the computer to execute the program.

The program describing the processing content can be recorded on a computer-readable recording medium. Examples of the computer-readable recording medium include a magnetic recording device, an optical disc, a magneto-optical recording medium, and a semiconductor memory.

The program may be distributed, for example, by selling, transferring, or lending a portable recording medium such as a DVD or a CD-ROM on which the program is recorded. Further, the program may be distributed by storing the program in a storage device of a server computer and transmitting the program from the server computer to another computer via a network.

First, for example, a computer that executes the program temporarily stores the program recorded on a portable recording medium or the program transmitted from the server computer on an own storage device. Then, when a process is performed, the computer reads the program stored in the own storage device and performs a process in accordance with the read program. As another execution form of the program, the computer may read the program directly from a portable recording medium and perform a process in accordance with the program and may further perform a process in accordance with a transmitted program one at a time when the program is transmitted from the server computer to the computer. The above-described processes may be performed by a so-called application service provider (ASP) type service that realizes a processing function in accordance only with an execution instruction and result acquisition without transmitting the program to the computer from the server computer. The program in this form is assumed to include an equivalence of the program (which is not a direct instruction for the computer, but is data or the like that has a nature defining a process of the computer) which is information provided for a process to be performed a computer.

In the embodiment, the device is configured by executing a predetermined program on a computer, but at least a part of the process content may be realized by hardware.

REFERENCE SIGNS LIST

1 Abnormality detection device
11 Vibration acquisition unit
12 Frequency domain conversion unit
13 Unexpectedness determination unit
14 Abnormality determination unit
15 Positional information acquisition unit
16 Positional information transmission unit
2 Abnormality location detection device
21 Positional information reception unit
22 Histogram generation unit
23 Abnormality location detection unit
231 Difference detection unit
24 Histogram storage unit
25 Traffic volume information acquisition unit

The invention claimed is:

1. An abnormality detection device comprising:
processing circuitry configured to:
   acquire an acoustic signal generated during passage of a vehicle on a road;
   convert the acquired acoustic signal into a frequency domain signal;
   determine whether there is unexpectedness at each predetermined frequency using the frequency domain signal, wherein the unexpectedness is based at least on a short-time average level and a long-time average level of a spectrum of each frequency and a threshold set in advance; and
   determine whether there is an abnormality in the road based on the number of frequencies at which it is determined that there is the unexpectedness.

2. An abnormality detection system comprising:
the abnormality detection device according to claim 1 and an abnormality location detection device,
   wherein the processing circuitry of the abnormality detection device configured to further transmit positional information of the road on which it is determined that there is the abnormality,
   the abnormality location detection device comprises processing circuitry configured to:
   (i) receive the transmitted positional information,
   (ii) generate a histogram by counting the number of positions corresponding to the received positional information in each pre-decided region, and
   (iii) determine a location at which there is an abnormality based on the generated histogram.

3. The abnormality detection system according to claim 2, wherein the processing circuitry of the abnormality location detection device is configured to further store a histogram, the histogram is generated previously by a histogram generation unit, and
the processing circuitry of the abnormality location detection device is further configured to:
   determine a location at which there is an abnormality on the basis of the previously generated histogram read from the processing circuitry of the abnormality location detection device; and determine that there is no abnormality with respect to the location where the abnormality was found previously when the location is presently determined that there is an abnormality on the basis of the generated histogram.

4. The abnormality detection system according to claim 2, wherein the processing circuitry of the abnormality detection device is configured to further acquire traffic volume information of each location, and the processing circuitry of the abnormality location detection device is further configured to:

calculate an abnormality detection ratio by dividing a count number included in the generated histogram by a traffic volume, and the traffic volume corresponding to the traffic volume information of a location corresponding to the count number; and determine that there is an abnormality in a region in which the calculated abnormality detection ratio is greater than a predetermined threshold.

5. The abnormality detection device according to claim 1, the processing circuitry of the abnormality detection device is further configured to:

acquire a vibration signal which is a signal of vibration generated during passage of a vehicle on a road; and convert the acquired vibration signal into the frequency domain signal.

6. An abnormality detection method comprising:

acquiring an acoustic signal generated during passage of a vehicle on a road by a vibration acquisition unit;

converting the acquired acoustic signal into a frequency domain signal by a frequency domain conversion unit;

determining whether there is unexpectedness at each predetermined frequency using the frequency domain signal by an unexpectedness determination unit, wherein the unexpectedness is based at least on a short-time average level and a long-time average level of a spectrum of each frequency and a threshold set in advance; and determining whether there is an abnormality in the road based on the number of frequencies at which it is determined that there is the unexpectedness by an abnormality determination unit.

7. A non-transitory computer readable medium that stores a program causing a computer to perform each step of the abnormality detection method according to claim 6.

* * * * *